United States Patent

Livingston

[15] 3,641,376
[45] Feb. 8, 1972

[54] SINGLE DRAG CUP MOTOR GENERATOR

[72] Inventor: Douglas J. Livingston, West Chester, Pa.

[73] Assignee: Harowe Servo Controls Inc., West Chester, Pa.

[22] Filed: Jan. 7, 1970

[21] Appl. No.: 1,211

[52] U.S. Cl. .............................. 310/113, 310/266, 310/171
[51] Int. Cl. ................................ H02k 47/20, H02k 17/42
[58] Field of Search ............ 310/113, 112, 266, 40 MM, 166, 310/171; 321/30; 310/96

[56] References Cited

UNITED STATES PATENTS

| | | | |
|---|---|---|---|
| 2,565,494 | 8/1951 | Gilfillan | 310/96 X |
| 2,757,299 | 7/1956 | Turner et al. | 310/266 |
| 2,871,383 | 1/1959 | King | 310/96 |

*Primary Examiner*—D. X. Sliney
*Attorney*—Woodcock, Washburn, Kurtz & Mackiewicz

[57] ABSTRACT

In a miniature motor generator, a drag cup is the rotating electrically conducting element for both the motor and the generator. The drag cup rotates about an iron core. Stator windings are energized to drive the cup as a motor. A second stator winding generates a signal representing rotational speed. In order to prevent interaction and cross coupling between the motor and the generator, the motor stator is wound with a different number of poles than the generator stator.

5 Claims, 2 Drawing Figures

PATENTED FEB 8 1972  3,641,376

SINGLE DRAG CUP MOTOR GENERATOR

BACKGROUND OF THE INVENTION

This invention relates to motor generators and more particularly to a miniature motor generator in which a drag cup is the rotating electrically conducting element for the motor and the generator.

In drag cup devices, the drag cup rotates about an iron core. Stator windings are provided outside of the rotating drag cup. Such devices may be used as a motor and as a tachometer generator. Turner et al. U.S. Pat. No. 2,757,299 shows a motor generator using a separate drag cup rotor for each device.

In many system applications, particularly servosystems for aircraft control, the size of the components and the weight and inertia of the rotor are critical. Both must be minimized.

SUMMARY OF THE INVENTION

In accordance with an important aspect of the present invention, a single drag cup is used as the rotating electrically conducting element for both a motor and a generator.

Where a motor and a generator are to be combined in the same unit, the overall length of the unit is reduced by using only a single drag cup. This type of construction has a shorter length than a motor generator using two drag cups because there is no hub on the shaft between the drag cups. Also, a device using two drag cups may require the use of two cores. Both the hub and the two cores add to the length of the device.

Where a single drag cup is provided for two devices, rotor currents and leakage flux may interact to produce fluctuations in the zero speed generator output or null. In accordance with another important aspect of the present invention, cross coupling and interaction between the motor and the generator are reduced by using a different number of poles on the stator of the motor from the number of poles on the stator of the generator. For example, in one embodiment of the invention, a four-pole generator and a two-pole motor are provided. Eddy currents from the motor symmetrically cut the generator flux and cancel each other.

DESCRIPTION OF A PARTICULAR EMBODIMENT

Figure 1:
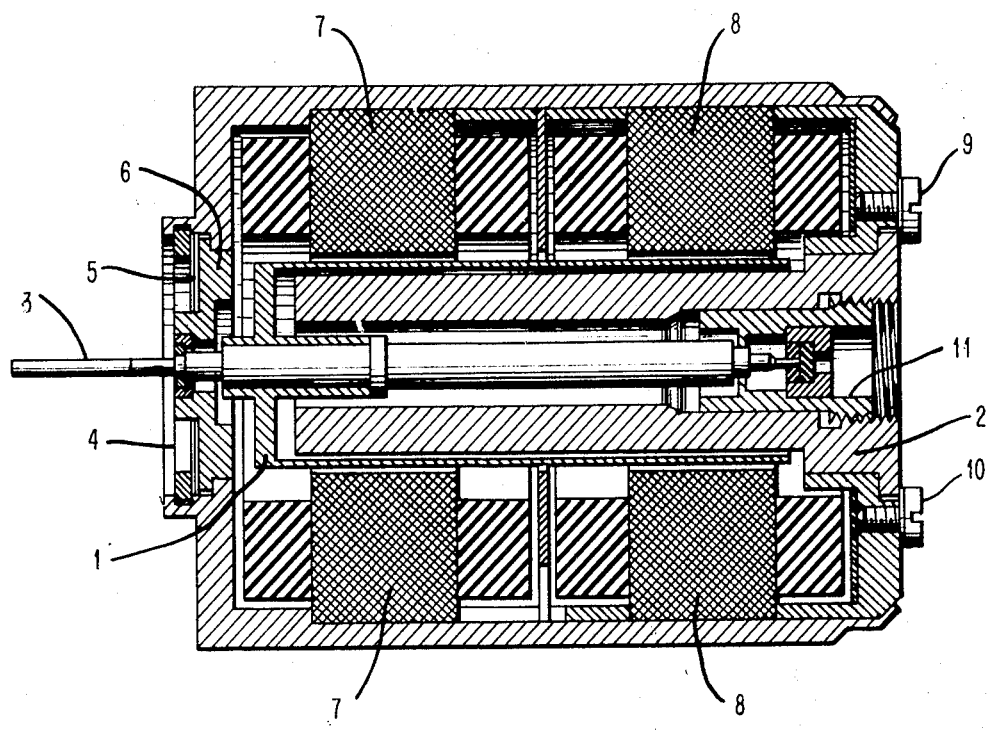
FIG. 1 shows a motor generator in accordance with the present invention.

Referring to FIG. 1, the motor generator includes the single rotating electrically conducting cup-shaped element 1. This element is commonly referred to as a drag cup. The cup-shaped element rotates about a fixed iron core 2 which is disposed within the cup-shaped element. While a one-piece iron core has been shown and described, a two-piece iron core may also be used.

The cup-shaped element 1 is mounted on the rotor assembly 3. The assembly at this end of the motor generator includes a retaining ring 4, a spring washer 5 and a mounted jewel bushing assembly 6.

The stator 7 for the generator is wound with four poles. The stator 8 for the motor is wound with two poles. Other pole combinations for the motor and the generator may be used.

Figure 2:
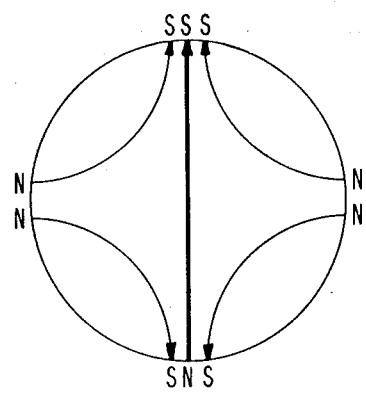
FIG. 2 shows the magnetic flux in the generator stator windings.

The advantages of using a different number of poles on the motor and the generator stators can be demonstrated with reference to FIG. 2. FIG. 2 shows the magnetic flux induced by the four-pole generator stator and the two-pole motor stator. The motor flux is indicated by the heavy centerline while the generator flux is indicated by the lighter lines. Note that the motor flux adds to the south pole generator flux at one end, but subtracts at the other end. Since the windings are in series, the motor flux is cancelled.

The motor windings are electrically energized to drive the cup-shaped element as a motor. An electrical signal representing the rotational speed of the cup-shaped element is induced in the generator output winding. The motor generator assembly is completed with end screws 9 and 10 and adjustment cup assembly 11.

The advantages of the single drag cup construction of the present invention can be appreciated by pointing out that a miniature motor generator less than 1.2 inches in length can be constructed. Generator outputs of 0.3 volts per 1,000 r.p.m. can easily be obtained with a signal-to-null ratio of 15:1 total and 45:1 in phase. Motor torque of 29,000 mg.mm. has been achieved with a total rotor inertia of 0.14 gm.cm.$^2$. Since in a typical application the motor-generator shaft load is a small lightweight pointer, the torque produced by the motor is more than adequate.

What is claimed is:

1. A motor generator comprising:
    a single rotating electrically conducting drag-cup-type element,
    ferrous core means disposed within said drag-cup-type element,
    first stator and windings disposed outside of said drag-cup-type element, said first stator and windings being electrically energized to drive said drag-cup-type element as a motor, and
    second stator and windings disposed outside of said drag-cup-type element, an electrical signal representing the rotational speed of said drag-cup-type element being induced in one of said second stator windings.

2. The motor generator recited in claim 1 wherein said first stator and windings are wound with a different number of poles than said second stator and windings to prevent cross coupling between the motor and the generator.

3. The motor generator recited in claim 1 wherein said ferrous core means is a single, one-piece, core.

4. A motor generator comprising:
    a single rotating electrically conducting cup-shaped element,
    ferrous core means disposed within said cup-shaped element,
    first stator and windings disposed outside of said cup-shaped element and electrically energized to rotate said cup-shaped element, and
    second stator and windings disposed outside of said cup-shaped element, an electrical signal representing the rotational speed of said cup-shaped element being induced in one of said second stator windings,
    said first stator and windings being wound with a different number of poles than said second stator and windings to prevent cross coupling between the motor and the generator.

5. The motor generator recited in claim 4 wherein said ferrous core means is a single, one-piece core.

* * * * *